March 9, 1965 G. T. RANDOL 3,172,265
DUAL-CYLINDER HYDRAULIC ACTUATOR FOR AUTOMOTIVE BRAKE SYSTEMS
Filed May 27, 1963 2 Sheets-Sheet 1
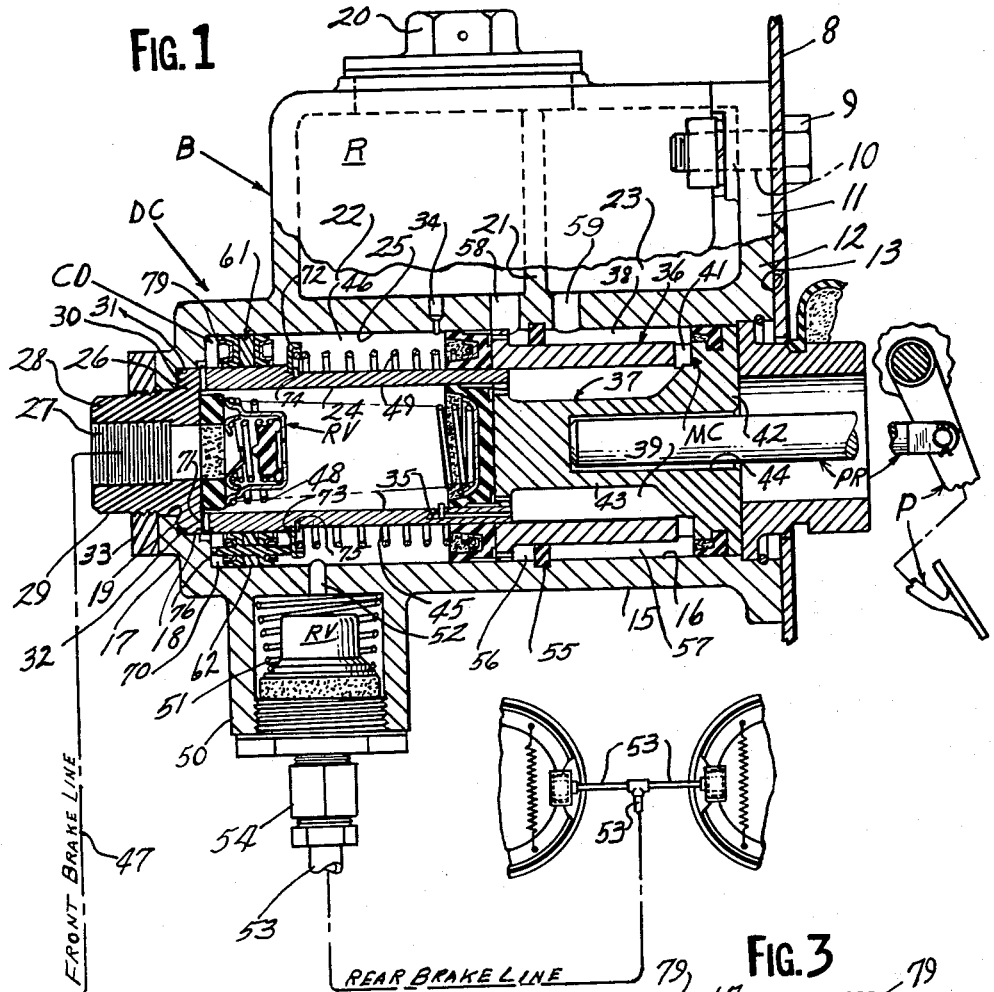
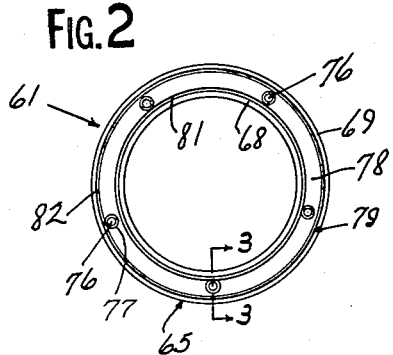
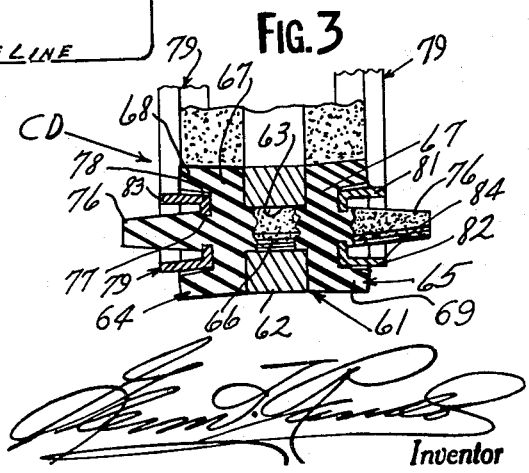
Inventor March 9, 1965  G. T. RANDOL  3,172,265
DUAL-CYLINDER HYDRAULIC ACTUATOR FOR AUTOMOTIVE BRAKE SYSTEMS
Filed May 27, 1963  2 Sheets-Sheet 2
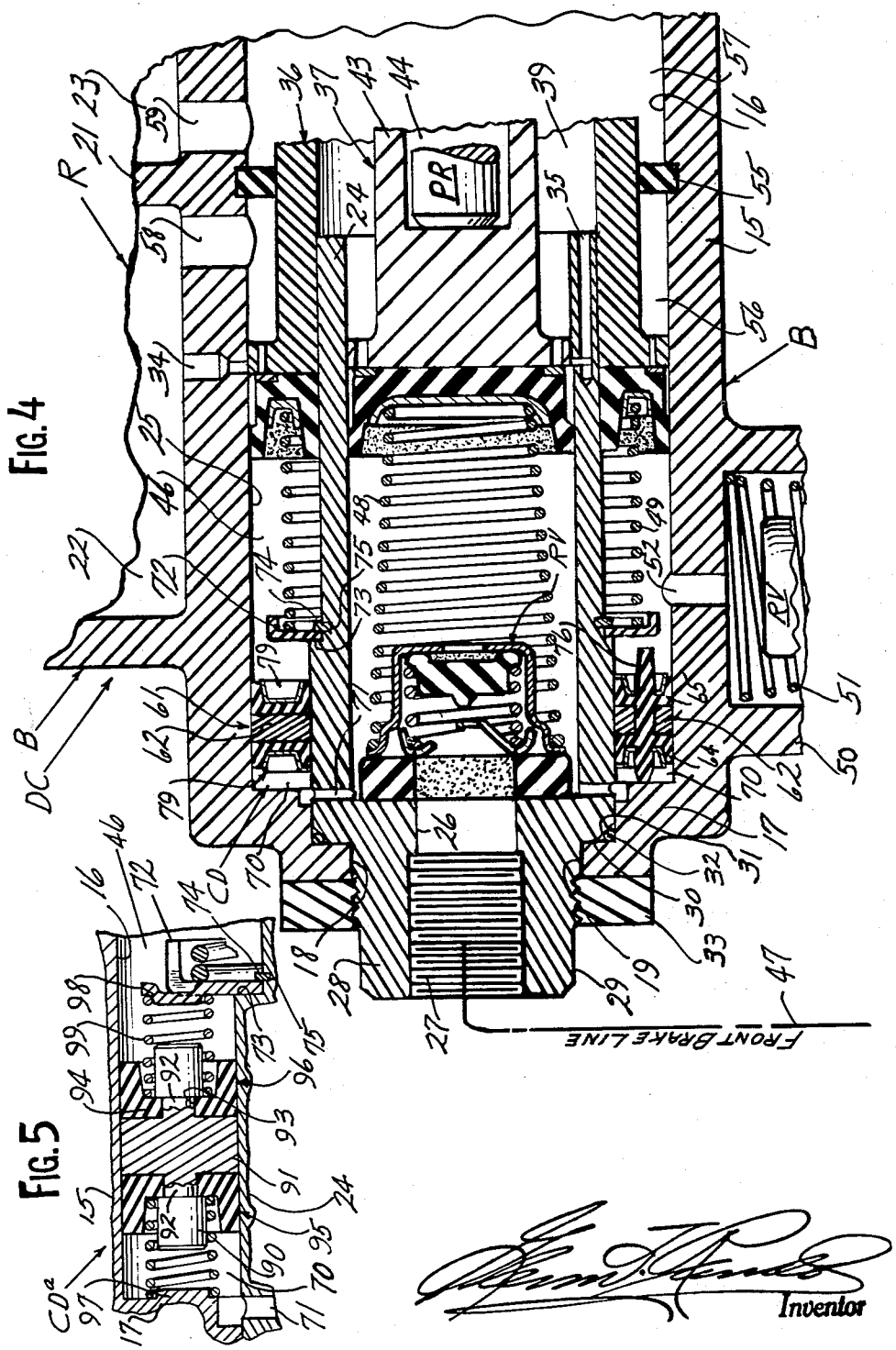

# United States Patent Office 3,172,265
Patented Mar. 9, 1965

3,172,265
DUAL-CYLINDER HYDRAULIC ACTUATOR FOR AUTOMOTIVE BRAKE SYSTEMS
Glenn T. Randol, 3 E. 2nd Ave., Loch Lynn,
P.O. Box 275, Mountain Lake Park, Md.
Filed May 27, 1963, Ser. No. 283,512
10 Claims. (Cl. 60—54.6)

My invention relates generally to duplex fluid braking systems incorporating a dual-cylinder hydraulic actuator of the general character disclosed in my copending U.S. application Serial No. 276,634, filed April 29, 1963, the invention having particular reference to novel and improved means to compensate for a differential of fluid demand in the systems without impairing the operativeness of one of the systems should the other system fail.

The primary object of the present invention is the provision of a new and improved double-acting fluid compensating device operably positioned between the actuator cylinders for actuation by the working fluid therein to effect fluid compensation therebetween.

More specifically, said device comprises an annular floating double-acting piston unit operably positioned at the forward end of the outer annular cylinder of a pair of coaxial cylinders arranged in overlapping relationship, said piston unit being releasably held in normal intermediate position by resilient means projecting from opposite sides thereof into engagement with fixed portions, respectively, on said cylinders, movement of said piston unit to effect fluid compensation being accommodated by yielding of said resilient means on one side or the other of said piston unit.

Other objects and advantages will become apparent to those skilled in the art to which the invention relates, in the course of the following description of the preferred embodiments illustrated in the accompanying drawing, and in which:

FIGURE 1 is a longitudinal vertical section of a master cylinder embodying my invention in operative association with a duplex automotive braking system schematically depicted in this view wherein the brakes are "off" and the parts of the master cylinder in their normal relative released positions;

FIGURE 2 is a view of the annular fluid-compensating piston per se showing particulars of the resilient projections on opposite sides thereof for biasing said piston toward its intermediate normal position;

FIGURE 3 is a transverse section taken on an enlarged scale along the line 3—3 of FIGURE 2 to clarify the details of said fluid compensating piston with the piston seal lips radially relaxed;

FIGURE 4 is a fragmentary enlargement of FIGURE 1 showing the compensating piston moved to compensate for fluid demand of the inner master cylinder piston over that of the outer annular piston thereof; and FIGURE 5 is a sectional view of a modified form of the compensating piston which utilizes solid projections in lieu of the aforesaid resilient projections, and a corresponding number of compression springs encircling said solid projections to react between confronting fixed portions on the master cylinder and said piston to bias the latter toward normal position.

Like characters of reference designate like parts in the several views.

Referring now to the drawing, and particularly to FIGURES 1, 2 and 3, I have used the reference character "DC" to designate my novel and improved dual-piston master cylinder as a whole, and the body thereof is designated by the reference character "B" which master cylinder is adapted, for example, to be mounted in operating position on the engine side of the vehicle firewall 8 by the usual means of a plurality of bolts 9 projecting through a like-number of holes 10 in marginal projections 11 integral with the rear flanged wall 12 of said body, said wall and projections having a smooth face 13 contiguous to said firewall as shown in FIGURE 1.

The basic structure of the present master cylinder is essentially the same as disclosed in my prior copending application Serial No. 276,634, filed April 29, 1963. Therefore, only that portion of the structure in operative association with my new and improved two-way fluid compensating device generally designated "CD," will be described in detail in the present specification. Reference may be had to my prior application when issued to Letters Patent for a complete structural description of the master cylinder as a whole.

The master cylinder body includes a cylindrical wall 15 which is processed with a bore 16 defined by a working surface substantially coextensive therewith with the forward end closed by a wall 17 or otherwise. The inner side of the end wall 17 is formed with a circular recess 18 coaxial with said bore, and merges with a central opening 19 extending to the exterior of said wall as shown in FIGURE 1. A fluid supply reservoir "R" having a filler cap 20, is formed as an integral part of and atop said wall 15 for gravitational feed into the bore 16. An integral partition wall 21 serves to divide the interior of said reservoir into front and rear compartments 22, 23, respectively. Removal of the filler cap enables filling the reservoir compartments as required.

Coaxially disposed substantially the forward half of said bore 16 is an inner cylinder 24 which serves for one of the brake lines, the wall of this cylinder being circularly spaced from the confronting working surface of the bore 16 to form an outer annular cylinder 25 for the other brake line. The forward end of the inner cylinder is closed by an integral wall 26 which is centrally bored to provide a discharge passage 27 for the latter cylinder. Projecting integrally from the outer side of said end wall 26 is a reduced externally threaded coaxial extension 28 which has a smooth terminating portion 29. An external annular shoulder 30 defines the juncture of the extension 28 and wall 26 of the inner cylinder with the outer corner of said shoulder being annularly beveled at 31 to provide an annular space of triangular cross section for reception of a commercial O-ring 32 to effect a fluid-tight seal between the closed ends of the master cylinder end wall 17 and inner cylinder 24 as shown. An enlarged hex locknut 33 engages the threaded portion on the extension 28 to draw the inner cylinder 24 into sealed engagement with said end wall 17 by subjecting said O-ring to compression, and thereby stabilizes said inner cylinder in coaxial relationship with respect to the bore 16 therefore the outer annular cylinder 25.

The outer cylinder is provided with a compensating port 34, and the inner cylinder has a compensating passage at 35 in the wall of the inner cylinder as shown.

Slidably interfitting the inner and outer cylinders 24, 25 are complementary fluid-displacement members (pistons 37, 36, respectively. The coaxial overlapping relationship of the reduced rearwardly extending portions of these pistons forms a pair of circularly aligned outer and inner annular fluid spaces 38, 39 interconnected by end slots 41 indented in the rear end of the outer piston. A relatively large fluid-retaining piston 42 slidably interfits the bore 16 as shown, and is integrally connected to the inner piston head by means of a cylindrical piston-carrying element 43 in which is provided an axial socket 44 for reception of the free end of a push-rod "PR" pivotally connected at its opposite end to the conventional suspended pedal designated "P" for reciprocation thereby.

The fluid-retaining piston 42 is adapted to engage the rear end of the outer piston 25 to move as a unit in a fluid pressurizing direction, therefore such engagement between the said pistons 24, 25 may be termed a "one-way mechanical connection" designated "MC."

The pistons 37, 36 provide with said end walls for the inner and outer cylinders 24, 25, respectively, complemental pressure working chambers 45, 46 to vary the rate of displacement and pressure on the fluid simultaneously discharged from said cylinders when a braking operation is made. Chamber 45 is connected via discharge passage 27 and brake line 47 indicated by a broken line in FIGURES 1 and 4, to the wheel cylinders of the front wheel brakes as shown in FIGURE 1. Operably disposed in said working chambers 45, 46 are normally preloaded compression springs 48, 49, respectively, to bias their respective pistons to their normally retracted positions best shown in FIGURE 1, spring 48 being utilized at its forward end to control the conventional residual pressure check-valve "RV," while an identical residual pressure check-valve is provided in a chambered lateral boss 50 integral with the exterior of said cylindrical wall 15 of the master cylinder body B, and which is controlled by a separate preloaded compression spring 51, said chambered boss communicating with the outer working chamber 46 by means of a port 52 through the wall 15 as shown, and the brake line 53 leading to the rear wheel brake cylinders is connected to said boss chamber by means of a commercial hydraulic fitting 54 whereby pressurized fluid in the outer working chamber 46 is displaced through the associated residual pressure check-valve RV into the brake line 53 to actuate the wheel cylinders for the rear brakes.

The fluid space 38 is divided by a resilient partition ring 55 having its outer peripheral marginal portion projecting into a complemental internal annular groove formed in the bore 16, into front and rear chambers 56, 57, respectively, which communicate with the front and rear reservoir compartments 22, 23 respectively via intake ports 58, 59, respectively, thus providing for each cylinder separate and independent fluid sources. Chambers 56, 57 vary in length in accordance with the movement of the two pistons from normal position, and are continuously filled with static fluid at atmosphere pressure.

In commercially applying the invention, as for example, to actuate the front and rear service brakes of an automotive vehicle, it is desirable to proportion the displacement members 36, 27 so that the displacement of each member substantially equals the fluid displacement required by its respective portion of the braking system actuatable thereby. If the fluid demand for each system is equal then the two displacement members 36, 37 would be as a unit, but if the ratio of displacements of the two systems which are connected to the working chambers 45, 46 should become different so that more fluid is required from one chamber than the other, means for compensating for this difference must be provided to enable both systems to be set up "solid" otherwise, for example, the front brakes would be applied and the rear brake unapplied and vice versa.

Accordingy, I have provided in accordance with the principles of the present invention, the aforementioned novel two-way fluid compensating device generally designated CD which is operably incorporated at the forward end of the outer annular cylinder 25, and is disclosed herein as a double-acting composite piston 61, said device being adapted to move relatively between said inner and outer pistons 37, 36 under influence of differential fluid pressure to equalize pressures on the fluid columns by said pistons to "solid" condition throughout both systems.

This novel fluid compensating device comprises the aforesaid double-acting piston 61 which includes a ring-like element 62 having a plurality of circumferentially spaced longitudinal holes 63, and a pair of annular sealing members 64, 65, one on each side thereof, which are preferably made of molded rubber and interconnected during the molding process by integral cylindrical portions 66 extending from the confronting inner faces of the vertical walls 67 through said holes whereby the sealing members are formed in spaced back-to-back relationship on opposite sides of the interposed ring-like element which would preferably be fabricated from a suitable metal, for unitary axial movement within the forward portion of the working chamber 46. Each of the sealing members is formed with a pair of inner and outer horizontal annular lips 68, 69, respectively, defining the inner and outer peripheral portions of said vertical wall 67 as shown in FIGURE 3, for pressure sealing the double-acting composite compensating piston 61 against transfer of fluid from one side to the other. An annular pressure-actuating chamber 70 is formed between the inner side of the end wall 17 of the outer cylinder 25 and the left side of said fluid compensating piston 61. The inner working chamber communicates with said chamber 70 via a port 71 through the wall of the inner cylinder 24. Spaced from the right side of the compensating piston 61 in normal position is a fixed annular spring seat member 72 which receives reaction on its right side from the forward end of the piston return spring 49, said spring seat member being stabilized on the outer surface of the normal diameter portion of said inner cylinder wall by means of an annular shoulder produced at 73 by enlarging the outer diameter of the forward portion of said inner cylinder wall, and a split retaining ring 74 engaging an external annular groove 75 in the normal outer surface portion of the cylinder wall in spaced relation to said shoulder, the inner peripheral marginal portion of said spring seat member occupying said space.

Coaxial with said cylindrical interconnecting portions 66 between said sealing members is a like-number of deformable projections 76 of soft rubber or other fluent material, and each of the latter being formed with an annular groove (see FIGURE 3) adjacent the outer face of the seal vertical wall 67, said connecting portions 66 extending through the holes 63 in the ring-like element to interconnect the vertical walls 67 of said sealing members in spaced back-to-back relationship as shown in FIGURES 1 and 3, said projections when distended normally engaging the inner side of that portion of the end wall 17 which forms the closed end of the annular cylinder 25, and the left side of the aforesaid fixed spring seat member 72 to releasably stabilize the fluid compensating piston 61 in its normal intermediate position as shown in FIGURE 1. In the event that the inner working chamber 45, for example, requires a greater fluid demand than the outer working chamber 46 to set the fluid in both chambers "solid" therefore their respectively connected brake lines and wheel cylinders actuated thereby, the fluid compensating piston 61 would move to the left from normal position as shown in FIGURE 4 to compensate for such demand until both working chambers are working at equivalent pressure. During such compensating movement of the piston 61, the projections 76 on the left side of the piston would be deformed substantially as shown in FIGURE 4 while those on the opposite right side of the piston would remain normally distended. Upon taking the brakes "off," that is, releasing the brake pedal P to its normal position shown in FIGURE 1, the spring reaction of the deformed projections to normalize would bias the compensating piston 61 back to its normal intermediate position in readiness for another compensating movement to the left or right depending on which of the working chambers exceeds in fluid demand for both chambers to be set "solid."

Each of the deformable projections 76 projects through a like-number of holes 77 in the vertical wall 78 of an annular stop member 79 having inner and outer annular flanges 81, 82 contiguous to the inner faces of the lips 68, 69 and adapted to interconnect said flanges 81, 82 to form a cross section complemental to the U-shaped cross section annular concavity of the sealing members. The marginal portion of each hole 77 is adapted to engage its complemental groove aforesaid in the projections 76 in fluid-tight sealed relation therewith to stabilize the stop members 79 on opposite sides of the seals 64, 65 for unitary axial movement. The free ends 83, 84 of said flanges 81, 82 respectively extend slightly beyond the edges of their respective sealing lips but are predeterminately spaced from their respective fixed members 17, 72 when the compensating piston 61 is in its normal intermediate position as shown in FIGURE 1. Therefore, movement of the compensating piston 61 in either direction from normal position is limited by engagement of the stop member ends 83, 84, depending on the direction of compensating movement, with their cooperating fixed abutments 17, 72 to prevent damaging the sealing lips under conditions in which one of the cylinders of the master cylinder becomes inoperative with resultant full compensating movement of the fluid compensating piston 61 under high working pressure from the operative cylinder, to provide a fixed wall for the associated working chamber for "solid" set up of the service brakes served by said operative cylinder. Upon the inoperative cylinder being made operative, the fluid compensating piston 61 moves automatically back to its normal intermediate position shown in FIGURE 1 in readiness for another compensating movement to balance fluid requirements between the two cylinders of the master cylinder DC as required.

The free ends 83, 84 of the seal flanges on the stop member 79 and their cooperating fixed member 17, 72, respectively, may be termed two pairs of cooperating abutment-engaging portions for flexibility in terminology.

As I have previously stated the inner and outer displacement members 37, 36 would normally be proportioned to provide equal displacements required in the dual systems connected to their respective working chambers 45, 46. When the pedal P is depressed both of the pistons 37, 36 will move into their respective cylinders 24, 25 the same distances but, if the fluid requirement of the system connected to chamber 45 has increased so that a greater amount of fluid is required than would normally be provided by the equal movements of said pistons 37, 36, the fluid compensating device CD will move to the left as described above to automatically compensate by an amount of fluid necessary to meet the increased demand on chamber 45. If, however, the amount of fluid by the system connected to working chamber 46 has increased above its normal demand upon unitary movement of the pistons 37, 36, the necessary additional quantity of fluid is supplied by movement of the compensating piston 61 to the right of its normal intermediate position.

It is thus seen from the foregoing operational description of my novel fluid compensating device CD, that the piston 61 literally "floats" between the pressure chamber 70 therefore the working chamber 45, and the working chamber 46, the latter chamber being in direct communication with the right side of the compensating piston 61 at all times.

In FIGURE 5 I have illustrated a modified form of my compensating device designated CD<sup>a</sup> in which the projections 76 are eliminated in favor of solid projections 90 integral with opposite sides of metallic ring 91 similar to ring 62, and an annular groove 92 is provided in each solid projection adjacent the sides of said ring 91 for reception of the central apertures 93 through the vertical wall 94 of the sealing members 95, 96, to stabilize the seals back-to-back against opposite sides of said annular metallic ring 91. The free ends of the solid projections are normally spaced from embossed confronting face portions 97, 98 on the inner side of the end wall 17 and the fixed spring seat member 72 respectively, when the compensating piston occupies its normal intermediate position shown in this figure, but left or right compensating movement of the compensating piston from its normal position brings the free ends of the projections on the corresponding side of the compensating piston into engagement with either the wall 17 or spring seat 72 as the case may be to limit the compensating movement of the piston from normal position. Each of the solid projections is encircled by a normally preloaded compression spring 99 to continuously bias the compensating piston toward normal position from either of its fluid compensating positions.

In the event one of the brake lines fractures therefore rendering the connected wheel brakes inoperative, or loss of fluid at any point from the working chamber to the connected wheel cylinder occurs, the operative cylinder moves the fluid compensating piston 61 to its extreme toward the inoperative working chamber so that the operative cylinder is effective to operate its connected vehicle brakes in usual manner without any interference from the inoperative cylinder. In the case of the modified compensating device of FIGURE 5 the solid extensions 90 on the side of the compensating piston communicating with the inoperative working chamber would engage the confronting fixed abutment 17 or 72 to stabilize the compensating piston for "solid" set up of the brakes by the operative cylinder. Thus, the free ends of the solid extensions and cooperating fixed members 17, 72 form what may be termed two additional pairs of cooperating abutment-engaging portions for limiting the compensating movement of said device CD.

From the foregoing description considered with the drawing, it will be seen that the objects enumerated above as well as others have been achieved, to produce a simplified design of a multi-displacement master cylinder unit which utilizes a one-way mechanical driving connection between the displacement members of the unit to establish equivalent pressure conditions within the dual-cylinders, and to contribute compactness to the unit for minimal overhang from the vehicle firewall, in fact, a body length of substantially the same length as the conventional single-piston master brake cylinder. It will be further appreciated that my novel two-way fluid compensating device positioned between the dual-cylinders automatically compensates for an increased fluid demand by either of the cylinders over the other cylinder, and that minimum initial pedal movement closes the compensating ports to render the dual-cylinders operative to effect operation of all four service brakes.

A further advantage provided by my two-way compensating device CD is the elimination of the fluid connection between the primary and secondary pistons of certain commercial tandem master cylinders, which becomes inoperative when the working chamber associated with the primary piston fails to pressurize the fluid, thus requiring the primary piston to mechanically engage the secondary piston to pressurize the fluid in its working chamber to operate the connected brakes. Under conditions of abnormal lost-motion in the dual braking systems, the pedal may reach the toeboard in the driver's compartment before the secondary piston can be operated resulting in loss of all four service brakes notwithstanding the brake system connected to the secondary piston cylinder is hydraulically operative, but loss of pedal in taking up the lost-motion introduced by the inoperative fluid connection between the pistons plus abnormal slack in the inoperative primary brake system prevents pedal-actuation of the secondary brake system.

It should be understood that I do not wish to limit my invention to the above-described novel association of elements and details, and that the invention includes such other modifications and substitutions readily apparent to those skilled in the art to which the invention relates, as defined by the terms of the subjoined claims.

Having thus described my invention, I claim:

1. In a combined dual master cylinder and a two-compartment fluid supply reservoir therefor: a pair of cylinders arranged concentrically in overlapping inner and outer relationship to one another, said cylinders being closed at one end and open at the other; a piston reciprocable in each cylinder relatively to normally retracted position; spring means biasing said pistons toward their respective normal positions; a pair of compensating ports normally open between said reservoir compartments and cylinders, respectively, when said pistons are in normal position; a pair of intake ports continuously open between said pistons and reservoir compartments, respectively; a fluid-retaining piston slidably interfitting a portion of the outer cylinder and cooperable with both pistons to define a pair of concentrically-overlapping annular fluid chambers which are maintained filled with fluid at reservoir pressure, and continuously communicate with one of said intake ports and the compensating port controlled by the inner piston; a one-way mechanical drive between said pistons enabling operating force applied to one of the pair of pistons to be transmitted simultaneously to the other piston in a fluid-pressurizing direction; a double-acting fluid compensating piston device operatively positioned in spaced relation to the closed end of one of the cylinders, said device being characterized by selective compensating movements in opposite directions from an intermediate normal position to equalize pressure in both cylinders; a pair of fluid chambers connecting opposite sides of said device to said cylinders, respectively; means biasing said device toward normal position; an operator-operated member operable from normally released position to actuate said pair of pistons as a unit to initially close said compensating ports to isolate the fluid in the reservoir compartments and concentric fluid chambers, and then pressurize the fluid within said cylinders; and a pair of discharge ports communicating with the interiors of said cylinders, respectively, for conveying such pressurized fluid to the exteriors thereof.

2. In a combined dual master cylinder and a two-compartment fluid supply reservoir therefor: a pair of cylinders arranged concentrically in overlapping inner and outer relationship to one another, said cylinders being closed at one end and open at the other; a piston reciprocable in each cylinder relative to a normally retracted position; spring means biasing said pistons toward their normal position; a pair of compensating ports normally open between said reservoir compartments and cylinders respectively when said pistons are in normal position; a pair of spaced intake ports continuously open between said pistons and reservoir compartments respectively; a fluid-retaining piston slidably interfitting a portion of the outer cylinder and cooperable with both pistons to define a pair of concentrically-overlapping annular fluid spaces; a partition wall fixed to the interior of the outer cylinder between the outer annular piston and said fluid-retaining piston, for converting the outer fluid space aforesaid into a pair of variable volume static fluid spaces which continuously communicate with said pair of intake ports respectively, with the inner fluid space aforesaid being continuously charged with a constant volume of static fluid at reservoir pressure; a fluid passage between said inner fluid space and one of said annular variable fluid spaces; a one-way mechanical drive between said pistons enabling operating force applied to one of the pair of pistons to be transmitted simultaneously to the other piston in a fluid-pressurizing direction; a double-acting fluid compensating piston device operatively positioned in spaced relation to the closed end of one of said cylinders, said piston device being characterized by selective compensating movements in opposite directions from a normal intermediate position to equalize pressure in both cylinders; a pair of fluid passages connecting opposite sides of said piston device to said cylinders respectively; means biasing said piston device toward normal position; an operator-operated member operable from normal released position to initially actuate said pair of pistons as a unit to close said compensating ports to isolate the fluid in the reservoir compartments and connected pair of annular fluid spaces from their respective cylinders and then further actuate said pistons to pressurize the fluid in said cylinders; and a pair of discharge ports communicating with the interiors of said cylinders respectively for conveying such pressurized fluid to the exteriors thereof.

3. In a combined dual master cylinder and a two-compartment fluid supply reservoir therefor: a pair of cylinders arranged concentrically in overlapping inner and outer relationship to one another, said cylinders being closed at one end and open at the other; a composite mechanical assembly comprising a pair of piston-like elements complemental to and slidable in said cylinders respectively; a pair of variable pressure-working chambers in said cylinders between their respective pistons and closed ends thereof, and activatable by said piston-like elements when moved as a unit from normally retracted position; a pair of discharge passages communicating with said working chambers respectively; a pair of compensating ports normally open between said reservoir compartments and said working chambers respectively when said piston-like elements are in normal position; a fluid-retaining piston longitudinally spaced from one of said piston-like elements and movable as a unit therewith in slidably interfitting relation to a portion of the outer cylinder; a pair of annular concentrically-related static fluid chambers disposed between said fluid-retaining piston and said pair of piston-like elements; a partition wall fixed to the interior of the outer cylinder portion between the outer piston-like element and said fluid-retaining piston, for converting the outer static fluid chamber into a pair of variable volume static chambers which normally communicate with said pair of intake ports respectively, with the inner static fluid chamber continuously charged with a constant volume of fluid at reservoir pressure; a fluid passage between said inner static chambers; a double-acting fluid compensating piston device operatively positioned in spaced relation to the closed end of the outer cylinder and to the piston-like element slidable therein, said piston device being characterized by selective fluid compensating movements in opposite directions from an intermediate normal position to equalize pressure in both working chambers, and the spacing of the piston device with respect to the closed end of the outer cylinder defining an annular pressure-actuating chamber; another fluid passage interconnecting said last-named chamber and the working chamber within the inner cylinder; a third fluid passage adapted to maintain continuous communication between said outer piston-like element and said piston device; spring means including a pair of normally preloaded springs operable in said working chambers respectively to bias said piston-like elements toward their respective normal positions; a one-way mechanical drive between said piston-like elements enabling operating force applied to one of the piston-like elements to be transmitted simultaneously to the other piston-like element in a fluid-pressurizing direction; an operator-operated member operable from normally released position to initially actuate said pair of piston-like elements as a unit to close said compensating ports to isolate the fluid in said compartments and connected static fluid chambers from their respective working chambers; and a pair of discharge ports communicating with said working chambers respectively for conveying such pressurized fluid to the exteriors thereof.

4. A combined dual master cylinder constructed in accordance with claim 3 in which said fluid compensating piston device comprises: a pair of spaced fixed abutments; an annular metallic ring-like element; a pair of annular pliant sealing members comprising a vertical wall with its inner and outer peripheries terminating in circularly spaced lips normal to said wall and defining therewith an annular concavity therebetween, said vertical walls being disposed contiguously to opposite sides respectively of said ring-like element; a plurality of circumferentially spaced holes longitudinally processed through said ring-like element; complemental portions of said pliant member projecting through said holes to interconnect the said vertical walls in back-to-back spaced relation against opposite sides respectively of said ring-like element and thereby stabilizing the sealing members on said ring-like element to move as a unit; a deformable embossment defining opposite sides of said vertical walls; an annular metallic stop member formed with a pair of concentrically-related horizontally disposed legs interconnected at corresponding ends by a vertical segment, said legs being circularly spaced to provide an annular concavity therebetween complemental to the concavity in said sealing member, and the free outer ends of said legs extend beyond the outer edge of the seal lips in normally spaced relation to said fixed abutments whereby said stop member is adapted to nest in said concavity in each of said sealing members to stabilize the lips of the latter in radially effective sealing relationship with the outer cylinder, and to limit the fluid compensating movement of said piston device from normal position by engagement with their respective fixed abutments; an aperture through the vertical wall of each stop member through which said deformable embossments extend respectively beyond the edges of said seal lips into engagement with their respective fixed abutments when said embossments are fully distended, said embossments being deformable to produce a biasing reaction on said piston device to urge the same toward its normal intermediate position wherein said embossments are fully distended, upon selective compensating movement of said piston device in either direction from said normal position to equalize pressure in both working chambers.

5. A combined dual master cylinder constructed in accordance with claim 3 in which said fluid compensating piston device comprises: a pair of spaced fixed abutments, one on each side of said piston device in spaced relation thereto respectively; an annular metallic ring-like element including a plurality of circumferentially spaced projecting elements extending from opposite sides thereof beyond opposite sides respectively of said piston device in spaced relation to said fixed abutments; an annular groove formed in each projecting element adjacent the corresponding side of said ring-like element; a pair of pliant annular sealing members each comprising a vertical wall terminating at its inner and outer peripheries in radially spaced lips normal to said wall to produce an annular concavity therebetween; a plurality of holes corresponding in number to the projecting elements, on each side of said ring-like element, formed in each of the vertical walls of the sealing members respectively, the peripheral marginal portions of said holes being received by the grooves respectively in said projecting elements to stabilize the sealing members on said ring-like element for movement as a unit therewith, said piston device being characterized by an intermediate normal position in which the free ends of said projecting elements are equally spaced on opposite sides of said piston device from their respective fixed abutments, and from which position said piston device is movable in opposite directions as defined by said fixed abutments to effect selective fluid compensating movements to equalize pressure in both of said working chambers; and a plurality of normally preloaded compression springs corresponding in number to said projecting elements and encircling the latter respectively to bias said piston device toward its normal intermediate position.

6. A dual-cylinder hydraulic actuator of the character disclosed comprising: a cylinder body, a longitudinal bore defining a cylindrical wall in said body and open at one end and closed at the other; a fluid supply reservoir having front and rear compartments in said body separate from said bore; fore and aft intake ports through the said wall for maintaining fluid communication between said front and rear reservoir compartments respectively and said bore; a compensating port through said wall in spaced relation to the fore intake port, and normally open to establish fluid communication between the front reservoir compartment and said bore; a tubular member closed at the same end as said bore and open at the other end to provide an inner cylinder characterized by an elongated cylindrical wall outwardly flanged at its forward end, and coaxially positioned within the forward portion of said bore in circularly spaced relation thereto to provide an annular outer cylinder therebetween; an annular fluid-displacement unit reciprocable in said outer cylinder from a normally retracted position; an annular pressure-working chamber in said outer cylinder normally defined by the normal position of said fluid-displacement unit and the confronting inner face portion on the closed end of said longitudinal bore, said chamber having fluid communication with the front reservoir compartment via said compensating port when said fluid-displacement unit is in normal position; an enlarged diameter portion extending from said flanged end of said tubular member to provide an external annular shoulder formed at the juncture of said enlarged diameter portion with the normal diameter portion of said tubular member; an annular groove formed in said normal diameter portion in spaced relation to said shoulder; a reduced diameter extension projecting forwardly from said enlarged diameter portion on said tubular member; a pressure outlet port through the bore wall communicating with said annular working chamber; a cylindrically chambered boss integral with said bore wall and projecting with an open outer end from the exterior thereof, said last-named port being adapted to place said boss chamber in fluid communication with said annular working chamber; a threaded closure cap for the open outer end of said chambered boss; a central threaded bore through said cap; an hydraulic line fitting threaded at one end into said central bore of said threaded cap; a removable ring-like pliant valve seat contiguous to the inner end of said cap; a residual pressure check-valve having an annularly flanged end adapted to engage said valve seat to control minimal line pressure external to said annular working chamber and accommodate displacement of pressurized fluid from said annular working chamber through said outlet port into said connected line; a central aperture through the closed end of said longitudinal bore through which said extension on said tubular member extends to the exterior thereof; a lock-nut adapted to engage an exposed threaded portion of said extension to stabilize said tubular member in coaxial overlapping relationship with respect to the forward confronting portion of said longitudinal bore; a cylindrical fluid-displacement unit reciprocable in said inner cylinder from normally retracted position, as a unit with said first-named fluid-displacement unit in a fluid pressurizing direction; a circular working chamber defined by the cylindrical fluid-displacement unit and confronting surface on the closed end of said tubular member; a discharge passage through said extension on said tubular member communicating with said last-named working chamber; another removable ring-like pliant valve seat contiguous to the inner marginal face of the inner end of said discharge passage; another residual pressure check-valve having an annularly flanged end adapted to engage said last-named valve seat to control minimal line pressure external to said last-named working chamber, and accommodate displacement of pressurized fluid therefrom through said discharge passage into the connected line; another normally preloaded compression spring operable in said last-named working chamber to react between the flanged end of said other residual pressure check-valve to control the same and said cylindrical fluid-displacement unit to bias the latter toward normal position; a compensating passage system incorporated in the wall of the open end portion of said tubular member, and which is normally open to interconnect said last-named working chamber with the rear reservoir compartment via said aft intake port when said cylindrical fluid-displacement unit is in normal position; a longitudinally spaced fluid-retaining piston defining the rear end of said cylindrical fluid-displacement unit, and which slidably interfits the rear portion of said longitudinal bore; a one-way mechanical drive between said fluid-displacement units enabling operating force applied to one unit to operate the other unit simultaneously in a fluid pressurizing direction; a pair of concentrically-related annular static fluid chambers between said fluid-retaining piston and said fluid-displacement units; a passage between said static chambers for maintaining fluid communication therebetween; an annular partition wall fixed in the longitudinal bore wall between said annular fluid-displacement unit and said fluid-retaining piston, said last-named wall being adapted to divide said outer static fluid chamber into a pair of variable volume static chambers in continuous fluid communication with said front and rear reservoir compartments via said fore and aft intake ports, respectively; a fixed annular abutment member disposed with its inner peripheral portion in the space between said annular shoulder and groove on said tubular member; a split retaining ring engaging the annular groove aforesaid in said tubular member to stabilize said annular abutment member against said last-named shoulder; a double-acting fluid compensating piston having deformable portions extending laterally from opposite ends thereof into engagement with the closed end of said annular working chamber and said abutment member respectively, to establish a normal intermediate position of said compensating piston upon said deformable portions being fully distended, said compensating piston being movable in opposite directions from normal position accommodated by deformation of said last-named portions to equalize pressure in both working chambers; an annular actuating-pressure chamber between said closed end of said annular working chamber and confronting end of said compensating piston; a fluid passage between said last-named chamber and the inner cylindrical working chamber; another fluid passage defined by the circular spacing of said annular abutment member from the said longitudinal bore to interconnect the other end of said compensating piston with the annular working chamber; and means for actuating said fluid-displacement units in unison in a fluid-pressurizing direction, and thereby effecting relative fluid compensating movement of said compensating piston from normal position to compensate for fluid demand differential between said working chambers.

7. A fluid pressure producing actuator comprising: a chamber-defining body provided with a two-compartment fluid supply reservoir; a pair of walled cylinders adapted to receive fluid from said two reservoir compartments, respectively, said cylinders being arranged in concentric overlapping relationship with separate discharge passages at one end thereof; a piston reciprocable in each of said cylinders from a fully retracted position; a double-acting fluid compensating member operatively mounted at the discharge end of one of the cylinders ahead of the piston reciprocable therein, for equalizing pressure in said cylinders; fluid communicating means between opposite ends of said compensating member and said cylinders, respectively; a pair of compensating ports incorporated in the cylinder walls, respectively, and which normally connect said cylinders to their respective reservoir compartments when said pistons are fully retracted; and a single operatable means for actuating both of said pistons as a unit in a fluid-pressurizing direction.

8. A fluid pressure producing actuator comprising: a chamber-defining body provided with a two-compartment fluid supply reservoir; a pair of walled cylinders adapted to receive fluid from said two reservoir compartments, respectively, said cylinders being arranged in concentric overlapping relationship; a piston reciprocable in each of said cylinders from a fully retracted position; a fixed wall closing the ends of said cylinders opposite their pistons reciprocable therein; a double-acting fluid compensating member having a normal intermediate position and selectively shiftable therefrom in opposite directions to equalize pressure in said cylinders, said compensating member being operatively mounted in one of the cylinders in spaced relation to the piston reciprocable in that cylinder; a variable pressure-working chamber in said one cylinder normally defined by the space between said compensating member in normal position and the piston reciprocable therein when the latter is in fully retracted position; another variable pressure-working chamber in the other cylinder normally defined by the space between the piston reciprocable therein when the latter is in fully retracted position, and said fixed wall; a pressure outlet for each of said working chambers; a fluid pressure-actuating chamber between said compensating member and said fixed wall; a fluid passage through the wall of said one cylinder for maintaining fluid communication between said last-named chamber and said other working chamber; a pair of compensating ports incorporated in the cylinder walls, respectively, and which normally connect said working chambers with their respective reservoir compartments when said pistons are fully retracted; and a single operatable means for actuating both of said pistons as a unit in a fluid-pressurizing direction.

9. A fluid pressure producing actuator comprising: an inner and an outer walled cylinder closed at one end and arranged concentrically in overlapping relationship, with the outer cylinder being of annular configuration; separate pressure outlets through the closed ends, respectively, of said cylinders; a complemental piston reciprocable in each of said cylinders from and to normal position; an annular double-acting fluid compensating piston reciprocable from a normal position in opposite directions and operatively mounted in said outer cylinder in spaced relation to its closed end and the complemental piston reciprocable therein, for equalizing pressure in said cylinders; an annular actuating-pressure chamber defined by the space normally obtaining between one end of said compensating piston in normal position and the cloesd end of the outer cylinder; a variable pressure-working chamber defined by the space normally obtaining between the other end of said compensating piston and the confronting complemental piston reciprocable in said outer cylinder; another variable pressure-working chamber defined by the space normally obtaining between the closed end of said inner cylinder and the complemental piston reciprocable therein; a fluid passage between said actuating-pressure chamber and said last-named working chamber for maintaining fluid communication therebetween; a pair of compensating ports incorporated in the cylinder walls, respectively, and which normally connect said working chambers with their respective reservoir compartments when said pistons reciprocable in said cylinders are in normal position; and a single operatable means for actuating both of said complemental pistons as a unit in a fluid-pressurizing direction.

10. A master cylinder constructed in accordance with claim 2 in which said partition wall is characterized by flexibility.

References Cited by the Examiner
UNITED STATES PATENTS 1,919,465  7/33  Furgason _____ 188—152.10 X
2,074,416  3/37  Oliver _____ 60—54.5

JULIUS E. WEST, *Primary Examiner.*

EDGAR W. GEOGHEGAN, *Examiner.*

UNITED STATES PATENT OFFICE
CERTIFICATE OF CORRECTION

Patent No. 3,172,265                                            March 9, 1965

Glenn T. Randol

It is hereby certified that error appears in the above numbered patent requiring correction and that the said Letters Patent should read as corrected below.

Column 2, line 34, for "form" read -- provide --; lines 60 and 61, for "(pistons" read -- (pistons) --; column 3, line 39, for "respectively" read -- , respectively, --; line 54, for "be" read -- move --; same column 3, line 62, for "Accordingy" read -- Accordingly --; column 5, line 9, for "respectively" read -- , respectively, --; line 49, for "on" read -- of --; line 50, for "by" read -- in --; column 6, line 52, for "becomes" read -- become --; column 7, line 47, for "respectively" read -- , respectively, --; line 49, after "compartments" insert a comma; line 58, after "ports" insert a comma; same column 7, line 73, after "cylinders" insert a comma; column 8, lines 7, 23 and 24, 54, and 66, for "respectively", each occurrence, read -- , respectively, --; same column 8, line 15, after "cylinders" insert a comma; line 21, after "chambers" insert a comma; same column 8, line 36, after "ports" insert a comma; column 9, lines 2, 7, 26 and 27, 43, and 68, for "respectively", each occurrence, read -- , respectively, --; line 40, after "thereto" insert a comma; same column 9, line 53, after "members" insert a comma; column 10, line 2, for "respectively" read -- , respectively, --; column 11, line 30, after "member" insert a comma.

Signed and sealed this 15th day of March 1966.

(SEAL)
Attest:

ERNEST W. SWIDER                                    EDWARD J. BRENNER
Attesting Officer                                  Commissioner of Patents